United States Patent
Johnston et al.

(10) Patent No.: US 9,234,631 B2
(45) Date of Patent: Jan. 12, 2016

(54) DRAG REDUCING POLYMERS FOR LOW MOLECULAR WEIGHT LIQUIDS APPLICATIONS

(75) Inventors: Ray L. Johnston, Ponca City, OK (US); William F. Harris, Ponca City, OK (US); Kenneth W. Smith, Tonkawa, OK (US)

(73) Assignee: Lubrizol Speciality Products, Inc., Houston, TX (US)

( * ) Notice: Subject to any disclaimer, the term of this patent is extended or adjusted under 35 U.S.C. 154(b) by 1273 days.

(21) Appl. No.: 12/337,994

(22) Filed: Dec. 18, 2008

(65) Prior Publication Data

US 2010/0154893 A1 Jun. 24, 2010

(51) Int. Cl.
*F17D 1/17* (2006.01)

(52) U.S. Cl.
CPC . *F17D 1/17* (2013.01); *Y02E 60/34* (2013.01); *Y10T 137/0391* (2015.04)

(58) Field of Classification Search
CPC ....... F17D 1/16; F17D 1/17; Y10T 137/0391; Y02E 60/34
USPC ............ 210/774; 95/157, 172–174, 178–179, 95/181, 241, 266; 137/13
See application file for complete search history.

(56) References Cited

U.S. PATENT DOCUMENTS

| | | | |
|---|---|---|---|
| 1,875,311 A * | 8/1932 | Voorhees et al. | 95/172 |
| 2,589,960 A * | 3/1952 | Ray | 95/172 |
| 2,958,205 A | 11/1960 | McConkey | |
| 2,970,177 A * | 1/1961 | Cobb, Jr. | 95/174 |
| 3,315,441 A * | 4/1967 | Hutton et al. | 95/173 |
| 4,822,393 A | 4/1989 | Markbreiter et al. | |
| 5,020,561 A | 6/1991 | Li | |
| 5,983,915 A | 11/1999 | Rojey et al. | |
| 7,018,434 B2 | 3/2006 | Waynick | |
| 2002/0065352 A1 * | 5/2002 | Johnston et al. | 524/487 |
| 2005/0189296 A1 * | 9/2005 | Yada et al. | 210/774 |

OTHER PUBLICATIONS

Anne Marie Helmenstine, Definition of Aliphatic Hydrocarbon, © 2014 About.com, http://chemistry.about.com/od/chemistryglossary/g/Aliphatic-Hydrocarbon-Definition.htm.*
C. L. Muth, T. U. Hannigan, R. S. Vruggink, and G. F. Pace, Pipeline & Gas J., 53-55, Jun. 1986 "Flow Improver Application in NGL Pipelines".

* cited by examiner

*Primary Examiner* — Arthur O Hall
*Assistant Examiner* — Chee-Chong Lee
(74) *Attorney, Agent, or Firm* — Michele M. Tyrpak; Teresan W. Gilbert

(57) ABSTRACT

A method for drag reducing low molecular weight liquids is provided. More specifically, a method to separate drag reducers from low molecular weight liquids, such as hydrocarbons and anhydrous ammonia, is provided.

14 Claims, 1 Drawing Sheet

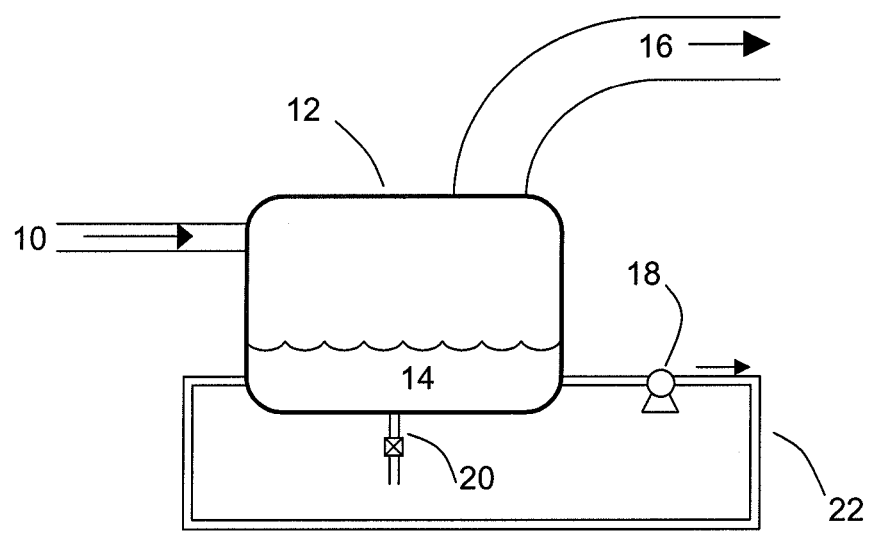

DRAG REDUCING POLYMERS FOR LOW MOLECULAR WEIGHT LIQUIDS APPLICATIONS

BACKGROUND OF THE INVENTION

1. Field of the Invention

The present invention relates generally to drag reducing methods for low molecular weight fluids. More specifically, the present invention relates to separation of drag reducers from low molecular weight liquids, such as hydrocarbons and anhydrous ammonia.

2. Description of the Prior Art

When fluids are transported by a pipeline, a drop in fluid pressure typically occurs due to friction between the wall of the pipeline and the fluid. Due to this pressure drop, for a given pipeline, fluid must be transported with sufficient pressure to achieve a desired throughput. When higher flow rates are desired through the pipeline, more pressure must be applied due to the fact that as flow rates are increased the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag reducing polymers typically have molecular weights in excess of five million.

Low molecular weight hydrocarbon fluids such as natural gas liquids ("NGLs") and liquefied petroleum gases ("LPGs") often are pipelined long distances under pressure as liquids. NGLs are often fractionated into their components which can include, but are not limited to, methane ($CH_4$), ethane ($C_2H_6$), propane ($C_3H_8$), butane ($C_4H_{10}$), pentane ($C_5H_{12}$), and heavier cuts ($C_6+$). LPGs can comprise fractionated ethane, propane, and butane that result from the processing of NGLs. Other LPGs can include, but are not limited to, iso-butane, dimethyl ether ($CH_3OCH_3$), and natural gasoline (or condensate). Ethylene which results from the cracking of ethane is also transported as an LPG.

Liquefied natural gas ("LNG") is a natural gas that has been cooled to below its boiling point (about $-260°$ C.) such that it condenses to a liquid. In LNG applications, the liquid is at temperatures where drag reducing agents ("DRAs") do not dissolve readily and, thus, usually cannot provide drag reduction. In general, most LNG applications do not require drag reducers since the LNG typically can be transported over long distances as cargo in insulated ships or trucks. Pumping as a liquid generally only occurs during loading and unloading of these vessels.

NGLs or LPGs generally are conducive to high levels of drag reduction, because when they are being transported in pipelines, the fluid is in turbulent flow and because the hydrocarbon DRA polymers are very soluble in the hydrocarbon fluid. However, typically, DRAs have not been utilized to drag reduce NGLs or LPGs due to a vast difference in the volatility of the DRA polymers relative to the NGL or LPG components.

The active ingredient in most commercial hydrocarbon DRAs for pipelines is an ultra-high molecular weight poly-alpha-olefin polymer. Because of the extremely large molecular size, the polymer molecules usually do not vaporize at any reasonable temperature. In fact, because of the large molecular size, the poly-alpha-olefin polymer can begin to thermally degrade at temperatures (about $550°$ F.) well below any theoretical polymer vaporization temperature. At temperatures above about $550°$ F., the polymer can break down into much smaller components which can vaporize at reasonable temperatures. Likewise, carrier fluids and other inactive components of many DRAs are larger molecules which do not vaporize unless temperatures are greater than about $360°$ F. However, in many cases, NGLs eventually can be vaporized in processing at temperatures well below about $360°$ F. or even about $550°$ F. If lower temperature vaporization occurs, usually only the NGL components will vaporize, and the DRA components will remain behind at the location of the vaporization.

If the NGL is only partially vaporized, then the DRA components can remain in solution, i.e., in the remaining unvaporized (liquid) portion of the NGL. The DRA then can be carried through the process in solution in this liquid portion, albeit now at a higher concentration due to the lower amount of liquid present after the partial vaporization. If full vaporization of the NGL occurs at a low temperature, then the DRA can remain behind at the location of full vaporization and, in theory, will have no liquid NGL component to carry it any further through the process. The DRA which deposits or remains behind at this location can be in a rubbery, semi-solid form, possibly along with some liquid portions of a DRA carrier. These dynamics can be present in the distillation/fractionation processes for NGL and are especially present in reboiler units. Depending upon the design of the reboiler unit, partial or full vaporization of the hydrocarbon stream can occur, and periodic flushes can be required to prevent over-concentration or deposition of DRA within the reboiler unit.

For the end use of LPGs (usually butane and propane) treated with DRAs, similar downstream effects need to be considered. If the LPG is used for blending into other liquid streams, such as fuels, then the presence of the DRA will, most likely, not be an issue. For instance, butane can be blended into gasoline, which is already an automobile fuel which is often treated with DRA. If the LPG is to be used in a downstream chemical process or directly as a fuel, then that process or end-use needs to be examined in detail for potential points of full vaporization. Fuels, such as propane, typically can be vaporized prior to carburization, and any DRA can "fall out" in the vaporizer unit.

Polymer deposition or "fallout" can cause problems if deposition occurs in an undesired location. Since poly-alpha-olefin DRA polymers can be soluble in hydrocarbon (e.g. oil, diesel fuel, kerosene), the polymer possibly can be solvated and flushed from the system. However, depending upon the amount of fallout and consistency of the deposited material, the solvation and flushing process can take considerable time, considerable volumes of solvent, and likely can require equipment downtime. Because DRAs can be soluble in the liquid medium they are drag reducing, DRA polymers cannot be removed by simple methods such as filtration. Therefore, a method to easily remove DRA polymers from low molecular weight pipeline liquids is needed.

SUMMARY OF THE INVENTION

In one embodiment of the present invention, there is provided a method for reducing the pressure drop associated with the turbulent flow of a low molecular weight fluid through a pipeline, said method comprising (a) introducing a drag reducing polymer into said low molecular weight fluid to form a mixture comprising a low molecular weight fluid and a drag reducing polymer; (b) vaporizing said mixture comprising a low molecular weight fluid and a drag reducing polymer in a vaporization vessel, wherein said vaporization vessel contains a high molecular weight liquid that is miscible with said mixture and contacts said mixture, such that said low molecular weight fluid enters a gas phase and said high molecular weight liquid remains in a liquid phase; (c) isolating said drag reducing polymer into said high molecular weight liquid from said mixture comprising a low molecular weight fluid and a drag reducing polymer to form (i) a drag reducer-containing high molecular weight liquid and (ii) a substantially drag reducer-free low molecular weight vapor; and (d) recovering said vaporized substantially drag reducer-free low molecular weight vapor. Optionally, the inventive method can further comprise the step of (e) recirculating said drag reducer-containing high molecular weight liquid through a high-shear device back into said vaporization vessel.

In another embodiment of the present invention, there is provided a method to separate a drag reducing polymer from a low molecular weight fluid, said method comprising (a) introducing a mixture comprising a low molecular weight fluid and a drag reducing polymer into a vaporization vessel, wherein said vaporization vessel contains a high molecular weight liquid that is miscible with said mixture and contacts said mixture, such that said low molecular weight fluid enters a gas phase and said high molecular weight liquid remains in a liquid phase; (b) vaporizing said mixture to vaporize said low molecular weight fluid in said vaporization vessel; (c) isolating said drag reducing polymer from said low molecular weight fluid to form (i) a substantially drag reducer-free low molecular weight vapor and (ii) a high molecular weight liquid comprising a drag reducing polymer and; (d) recovering said substantially drag reducer-free low molecular weight vapor. Optionally, the inventive method can further comprise the step of (e) recirculating said high molecular weight liquid comprising a drag reducing polymer through a high shear device back into said vaporization vessel.

BRIEF DESCRIPTION OF THE DRAWINGS

A preferred embodiment of the present invention is described in detail below with reference to the attached drawing figures, wherein:

FIG. 1 is a schematic representation of a vaporization vessel that can be used to remove DRA from a treated low molecular weight fluid.

DETAILED DESCRIPTION

The following detailed description of various embodiments of the invention illustrates specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Low molecular weight fluids useful in this invention are selected from the group consisting of low molecular weight non-hydrocarbons and low molecular weight hydrocarbons. Low molecular weight non-hydrocarbons that can be used in this invention include, but are not limited to, ammonia ($NH_3$), hydrochloric acid (HCl), carbon dioxide ($CO_2$), hydrofluoric acid (HF), silicon tetraflouride ($SiF_4$), hydrogen ($H_2$), borane ($B_2H_6$), freons, and mixtures thereof.

Drag reducers useful in this invention can be any drag reducer that can be compatible with the low molecular weight fluid. Preferred drag reducers for non-hydrocarbon low molecular weight fluids are those which can be water or alcohol soluble. Generally, these preferred drag reducers comprise acrylamide polymers and acrylamide/acrylic acid copolymers (and salts thereof). Preferred drag reducers for low molecular weight hydrocarbon fluids are those comprising alphaolefin polymers. Other polymers useful to make drag reducers include, but are not limited to, polymers of acrylic esters, polymers of methacrylic esters, and mixtures thereof.

Low molecular weight fluid 10 which has been treated with a polymeric DRA enters the vaporization vessel 12. Vessel 12 can be operated at temperature and pressure conditions such that low molecular weight fluid 10 vaporizes. High molecular weight liquid 14 also can be referred to as an absorbing fluid. High molecular weight liquid 14 can be present in vessel 12 and can be in contact with entering low molecular weight fluid 10 as low molecular weight fluid 10 is flashed into vapor. The volatility of high molecular weight liquid 14 is substantially lower than the volatility of low molecular weight fluid 10, such that very little or no high molecular weight liquid 14 can be vaporized under the temperature and pressure conditions of vessel 12. High molecular weight liquid 14 also can be miscible with and a solvent for the DRA polymer.

As low molecular weight fluid 10 flashes and becomes low molecular weight vapor 16, the DRA polymer does not flash and can be absorbed and can dissolve into high molecular weight liquid 14. Thus, low molecular weight vapor 16, which is substantially DRA free, can exit vessel 12. As additional low molecular weight fluid 10 enters vessel 12 and flashes into low molecular weight vapor 16, more DRA polymer can be absorbed into high molecular weight liquid 14, and the concentration of DRA polymer in high molecular weight liquid 14 can increase.

High molecular weight liquid 14 can be periodically or continuously recirculated in loop 22 from vessel 12 and back into vessel 12. Recirculation by high-shear pump 18 can serve to continuously shear, or break down, any ultra high molecular weight DRA polymer since DRA can concentrate over time in high molecular weight liquid 14. The shearing of ultra high molecular weight DRA polymer can allow polymer to concentrate to high levels without significantly increasing the viscosity of high molecular weight liquid 14. Because the volume of the high molecular weight liquid 14 can be small, relative to the volume of low molecular weight fluid 10 entering vessel 12, the recirculation rate can be low and high-shear pump 18 can be small with minimal power requirements.

Over time, the concentration of polymer in high molecular weight liquid 14 can reach a high enough level such that the fluid viscosity of high molecular weight liquid 14 can become high. At this point, high molecular weight liquid 14 can be removed from vessel 12 through port 20 and fresh high molecular weight liquid 14 can be replaced back into vessel 12. Recirculation pump 18 can be utilized to remove the absorbing fluid from vessel 12 and to pump fresh absorbing fluid into vessel 12.

Optionally, high molecular weight liquid 14 can be directly removed from vessel 12, and not recirculated back into vessel 12 via line 22.

High molecular weight liquid 14 can be a solvent for the DRA polymer and high molecular weight liquid 14 must have a much lower vapor pressure (volatility) than low molecular weight fluid 10 which is being vaporized. It is preferable that high molecular weight liquid 14 has a low viscosity and that high molecular weight liquid 14 be relatively inexpensive.

When low molecular weight fluid 10 is a non-hydrocarbon and the drag reducing polymer is polyacrylamide, high molecular weight liquid 14 is selected from the group consisting of water, glycols, alcohols, and mixtures thereof. When low molecular weight fluid 10 is a hydrocarbon and the drag reducing polymer is a polyalphaolefin, high molecular weight liquid 14 is selected from the group consisting of diesels, gasolines, kerosenes, motor oils, crude oils and mixtures thereof.

In one exemplary case where the low molecular weight fluid can be propane and the DRA is a polyalphaolefin, the high molecular weight liquid, i.e., absorbing fluid can be diesel, which is relatively inexpensive. Also, the DRA-laden diesel can be removed from the vaporization vessel, recycled to a refinery, and re-processed with crude oil. Alternatively, any DRA-laden diesel can be burned as fuel. In another example, where the low molecular weight fluid can be NGL and the DRA can be a polyalphaolefin, the high molecular weight liquid can be a $C_6+$ cut from downstream distillation of the NGL itself. The heavy $C_6+$ cut, after passing through the vessel, can be sent on for further processing, burned as fuel, or blended into other fuels.

The present invention can allow DRA to be added to long distance pipelines carrying hydrocarbons such as NGL, ethane/propane mix, or propane with several pump stations and multiple DRA injection sites. The present invention could be located at the final terminus of the pipeline, and not at other locations along the pipeline. If needed, the low molecular weight hydrocarbon can be recompressed following vaporization. The recompressed hydrocarbon can then be free of any DRA polymer.

EXAMPLES

The following examples illustrate the effectiveness of the invention and methods for reducing the pressure drop associated with flowing low molecular weight fluids through a pipeline.

In general, two laboratory tests were conducted to demonstrate this invention. In these tests, pentane (a low-molecular-weight hydrocarbon), treated with Refined Product II Flow Improver (obtained from ConocoPhillips Company or ConocoPhillips Specialty Products, Inc.) was slowly pumped into a small, heated pool of high-molecular-weight hydrocarbon (diesel or mineral oil). The pentane was allowed to flash off or vaporize and the vaporized pentane was collected through a condenser into a secondary vessel. The collected pentane and retained diesel/mineral oil were tested by gel permeation chromatography (GPC) for final DRA polymer content.

Example 1

In this Example, 2000 ml of pentane was treated with 105 ppm DRA polymer (408 ppm Refined Product II Flow Improver) and placed into the feed container. Refined Product II Flow Improver is commercially available from ConocoPhillips Specialty Products, Inc. or ConocoPhillips Company and was prepared in accordance with U.S. Pat. Nos. 6,172,151 and 6,569,832, the entirety of both are herein incorporated by reference. 100 mls of diesel fuel was placed into the flask. The diesel was heated to approximately 140° F. and then the pentane was slowly pumped over into the flask at a rate of 7 to 10 ml/minute. Moderate heat was kept on the flask to maintain temperature. As the pentane flashed from the flask, it was captured, condensed, and collected in a collection container. Nearly all the pentane (1990 ml) was pumped into the flask. Total pumping time was approximately 250 minutes. Once all the pentane was pumped and collected, the collection container was removed. 1970 mls of pentane were collected. The diesel in the flask became very viscous and elastic (there was no mechanical shearing of the DRA within the diesel in the flask). This diesel was removed as well as possible and collected (approximately 93 ml).

Duplicate GPC analyses of the collected pentane and diesel were as follows:
Collected pentane: 0 ppm, 0 ppm
Diesel: 1664 ppm, 1672 ppm It is believed that the analytical results are within analytical error allowances. A mass balance calculation on the DRA polymer, assuming all DRA was recovered in the diesel, showed that 1655 ppm polymer should result in the diesel. The results of this test demonstrated that all DRA polymer remained in the heavier oil (diesel) and that the DRA did not carry on through with the pentane.

Example 2

In this Example, 2000 ml of pentane was treated with 105 ppm DRA polymer (408 ppm Refined Product II Flow Improver) and placed into the feed container. Refined Product II Flow Improver is commercially available from ConocoPhillips Specialty Products, Inc. or ConocoPhillips Company and was prepared in accordance with U.S. Pat. Nos. 6,172,151 and 6,569,832, the entirety of both are herein incorporated by reference. Approximately 51 mls of mineral oil was placed into the flask. The mineral oil was heated to approximately 160° F. and then the pentane was slowly pumped over into the flask at a rate of 7 to 10 ml/min. Moderate heat was kept on the flask to maintain temperature. As the pentane flashed from the flask, it was captured and condensed and collected in the collection container. After about 2/3 of the treated pentane was pumped, the mineral oil in the flask got extremely elastic and bubbling (from the vaporizing propane) to form elastic bubbles or "foam" which was carrying almost to the condenser inlet. At that point, the flow of feed pentane was stopped to avoid any carryover of the "foam" to the collection vessel. Total pumping time was about 154 minutes and 1320 mls of the original pentane had been pumped into the flask. The collection container was removed and contained approximately 1303 mls of pentane was collected. The elastic, viscous mineral oil was removed from the flask as well as possible and collected.

Duplicate GPC analyses of the collected pentane and triplicate GPC analyses of the collected mineral oil were as follows:
Collected pentane: 0 ppm, 0 ppm,
Mineral oil: 1804 ppm, 1825 ppm, 1905* ppm

*Because the mineral oil was so viscous, this sample was sonicated prior to analysis in an attempt to shear the polymer to make the analysis easier.

It is believed that the analytical results are within analytical error allowances. A mass balance calculation on the DRA polymer, assuming all the pumped DRA was recovered in the mineral oil, showed that 1884 ppm polymer should result in the mineral oil. The results of this test demonstrated that all the DRA polymer remained in the heavier oil (mineral oil) and that none of the DRA carried on through with the pentane. This test also demonstrated the need to maintain some means of shearing the heavier oil pool as the DRA polymer concentrates in the pool, which is one of the principles of this invention. If the heavy oil pool is not continuously sheared, the pool can become very viscoelastic and can tend to form a "viscoelastic foam" which could eventually carry polymer over into the flashing, light hydrocarbon. Also, shearing the heavy oil pool can allow the oil to remain lower in viscosity and allow for more ultimate levels of DRA polymer to be concentrated into the oil before replacement of the heavy oil pool can be required.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Claims Not Limited to the Disclosed Embodiments

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

That which is claimed:

1. A method for reducing the pressure drop associated with the turbulent flow of a low molecular weight fluid through a pipeline, said method comprising:
    (a) introducing a drag reducing polymer into said low molecular weight fluid to form a mixture comprising said low molecular weight fluid and said drag reducing polymer;
    (b) heating to partially vaporize said mixture comprising said low molecular weight fluid and said drag reducing polymer in a vaporization vessel, wherein said vaporization vessel contains a high molecular weight liquid that is miscible with said mixture and contacts said mixture, such that said low molecular weight fluid enters a gas phase and said high molecular weight liquid remains in a liquid phase;
    (c) transferring said drag reducing polymer into said high molecular weight liquid from said mixture comprising said low molecular weight fluid and said drag reducing polymer to form (i) a drag reducer-containing high molecular weight liquid and (ii) a substantially drag reducer-free low molecular weight vapor; and
    (d) recovering said substantially drag reducer-free low molecular weight vapor,
wherein said drag reducing polymer is a polymer selected from the group consisting of alpha-olefins, acrylamides, acrylamide acrylic acid copolymers (and salts thereof), acrylic esters, and methacrylic esters;
wherein said low molecular weight fluid is low molecular weight non-hydrocarbon fluids or low molecular weight hydrocarbon fluid; and
wherein said drag reducing polymer is a high molecular weight polymer having a weight average molecular weight greater than about 4 million.

2. The method in accordance with claim 1 further comprising the step of:
    (e) recirculating said drag reducer-containing high molecular weight liquid through a high-shear device back into said vaporization vessel.

3. The method in accordance with claim 1 wherein said drag reducing polymer is in a solution.

4. The method in accordance with claim 1 wherein said low molecular weight fluid is a low molecular weight non-hydrocarbon fluid selected from the group consisting of ammonia ($NH_3$), hydrochloric acid (HCl), hydrofluoric acid (HF), carbon dioxide ($CO_2$), silicon tetraflouride ($SiF_4$), hydrogen ($H_2$), borane ($B_2H6$), freons, and mixtures thereof.

5. The method in accordance with claim 1 wherein said low molecular weight fluid is a low molecular weight hydrocarbon fluid selected from the group consisting of natural gas liquids, liquid petroleum gases, and mixtures thereof.

6. The method in accordance with claim 1 wherein said high molecular weight liquid is selected from the group consisting of diesels, gasolines, kerosenes, motor oils, crude oils, and mixtures thereof.

7. The method in accordance with claim 1 wherein a vaporization temperature within the vaporization vessel is within a range of about −50° F. and 250° F.

8. A method to separate a drag reducing polymer from a low molecular weight fluid, said method comprising:
    (a) introducing a mixture comprising said low molecular weight fluid and said drag reducing polymer into a vaporization vessel, wherein said vaporization vessel contains a high molecular weight liquid that is miscible with said mixture and contacts said mixture, such that said low molecular weight fluid enters a gas phase and said high molecular weight liquid remains in a liquid phase;

(b) heating to partially vaporize said mixture to vaporize said low molecular weight fluid in said vaporization vessel;

(c) transferring said drag reducing polymer from said low molecular weight fluid to form (i) a substantially drag reducer free low molecular weight vapor and (ii) a high molecular weight liquid comprising a drag reducing polymer; and (d) recovering said substantially drag reducer free low molecular weight vapor, wherein said drag reducing polymer is a polymer selected from the group consisting of alpha-olefins, acrylamides, acrylamide acrylic acid copolymers (and salts thereof), acrylic esters, and methacrylic esters;

wherein said low molecular weight fluid is low molecular weight non-hydrocarbon fluids or low molecular weight hydrocarbon fluid; and wherein said drag reducing polymer is a high molecular weight polymer having a weight average molecular weight greater than about 4 million.

9. The method in accordance with claim 8 further comprising the step of:

(e) recirculating said high molecular weight liquid comprising a said drag reducing polymer through a high shear device back into said vaporization vessel.

10. The method in accordance with claim 8 wherein said drag reducing polymer is in a solution.

11. The method in accordance with claim 8 wherein said low molecular weight fluid is a low molecular weight non-hydrocarbon fluid selected from the group consisting of ammonia ($NH_3$), hydrochloric acid (HCl), carbon dioxide ($CO_2$), hydrofluoric acid (HF), silicon tetraflouride ($SiF_4$), hydrogen ($H_2$), borane ($B_2H_6$), freons, and mixtures thereof.

12. The method in accordance with claim 8 wherein said low molecular weight fluid is a low molecular weight hydrocarbon fluid selected from the group consisting of natural gas liquids, liquid petroleum gases, and mixtures thereof.

13. The method in accordance with claim 8 wherein said high molecular weight liquid is selected from the group consisting of diesels, gasolines, kerosenes, motor oils, crude oils, and mixtures thereof.

14. The method in accordance with claim 8 wherein a vaporization temperature within the vaporization vessel is within a range of about −50° F. and 250° F.

* * * * *